(12) United States Patent
Yamazaki et al.

(10) Patent No.: US 7,706,568 B2
(45) Date of Patent: Apr. 27, 2010

(54) INFORMATION PROCESSING APPARATUS, INFORMATION PROCESSING METHOD, AND COMPUTER READABLE STORAGE MEDIUM

(75) Inventors: Taeko Yamazaki, Kawasaki (JP); Junichi Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 11/466,869

(22) Filed: Aug. 24, 2006

(65) Prior Publication Data
US 2007/0055885 A1 Mar. 8, 2007

(30) Foreign Application Priority Data
Sep. 8, 2005 (JP) .............................. 2005-260883
Jul. 31, 2006 (JP) .............................. 2006-208499

(51) Int. Cl.
*G06K 9/00* (2006.01)
(52) U.S. Cl. .................................................. 382/100
(58) Field of Classification Search ........................ None
See application file for complete search history.

(56) References Cited
U.S. PATENT DOCUMENTS
5,898,779 A 4/1999 Squilla et al.

2006/0112013 A1* 5/2006 Maloney ....................... 705/45

FOREIGN PATENT DOCUMENTS
JP 11-41453 * 2/1999

* cited by examiner

*Primary Examiner*—Charles Kim
(74) *Attorney, Agent, or Firm*—Canon U.S.A. Inc., I.P. Division

(57) ABSTRACT

A method is provided that enables verification of whether a component of original image data has been altered at the location at which the component is to be reused without newly generating a signature. More specifically, the method includes inputting first document data including a plurality of components and signature information corresponding to the components, selecting at least one component from among the components, and extracting signature information corresponding to the at least one selected component. The method further includes storing the at least one selected component and the signature information corresponding to the at least one selected component in a memory, and generating second document data by pasting the at least one stored component and the stored signature information into a document selected as a paste location.

8 Claims, 19 Drawing Sheets

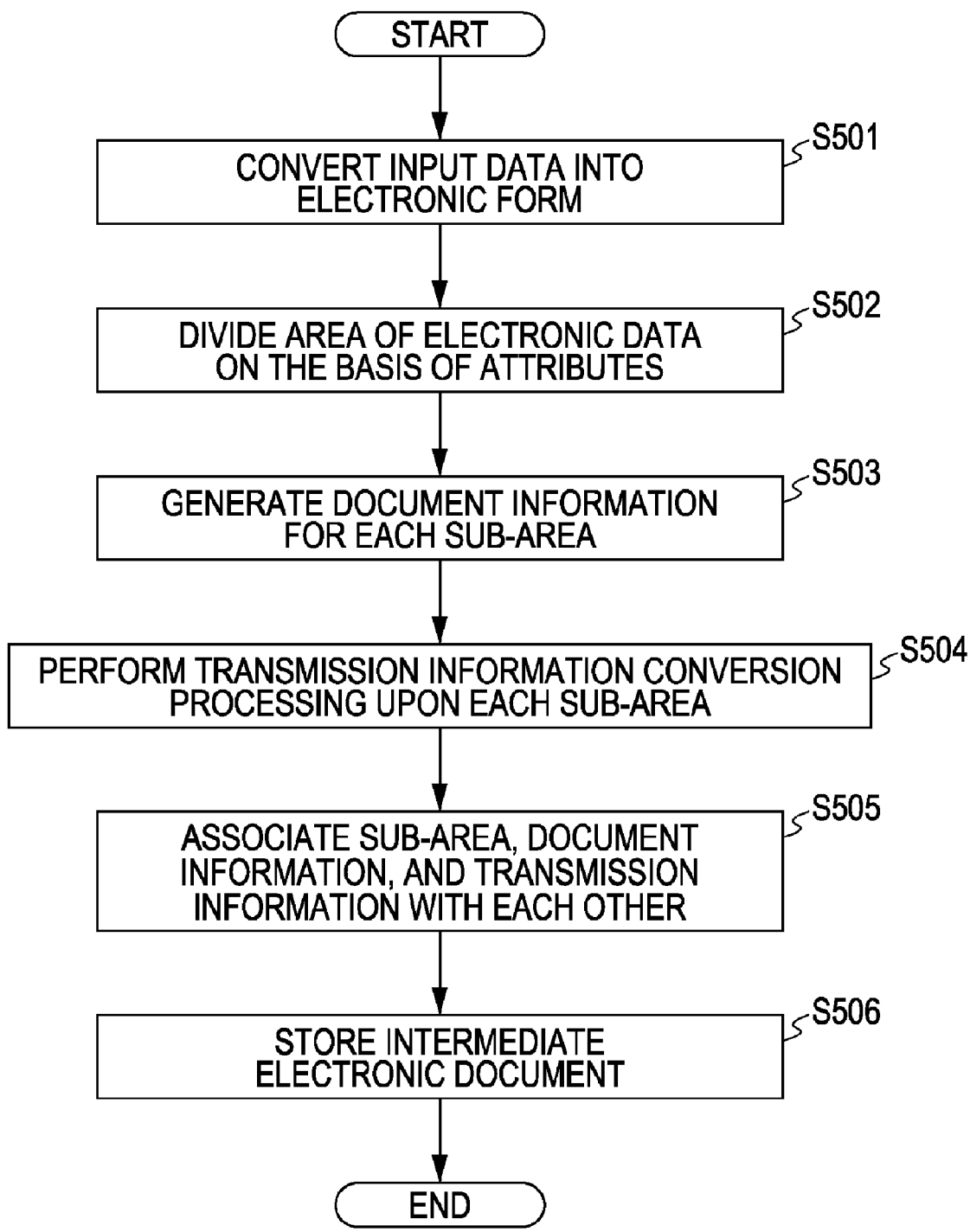

| TRANSMISSION INFORMATION a | SIGNATURE INFORMATION 1 |
| TRANSMISSION INFORMATION b | SIGNATURE INFORMATION 2 |
| DOCUMENT INFORMATION | SIGNATURE INFORMATION 3 |

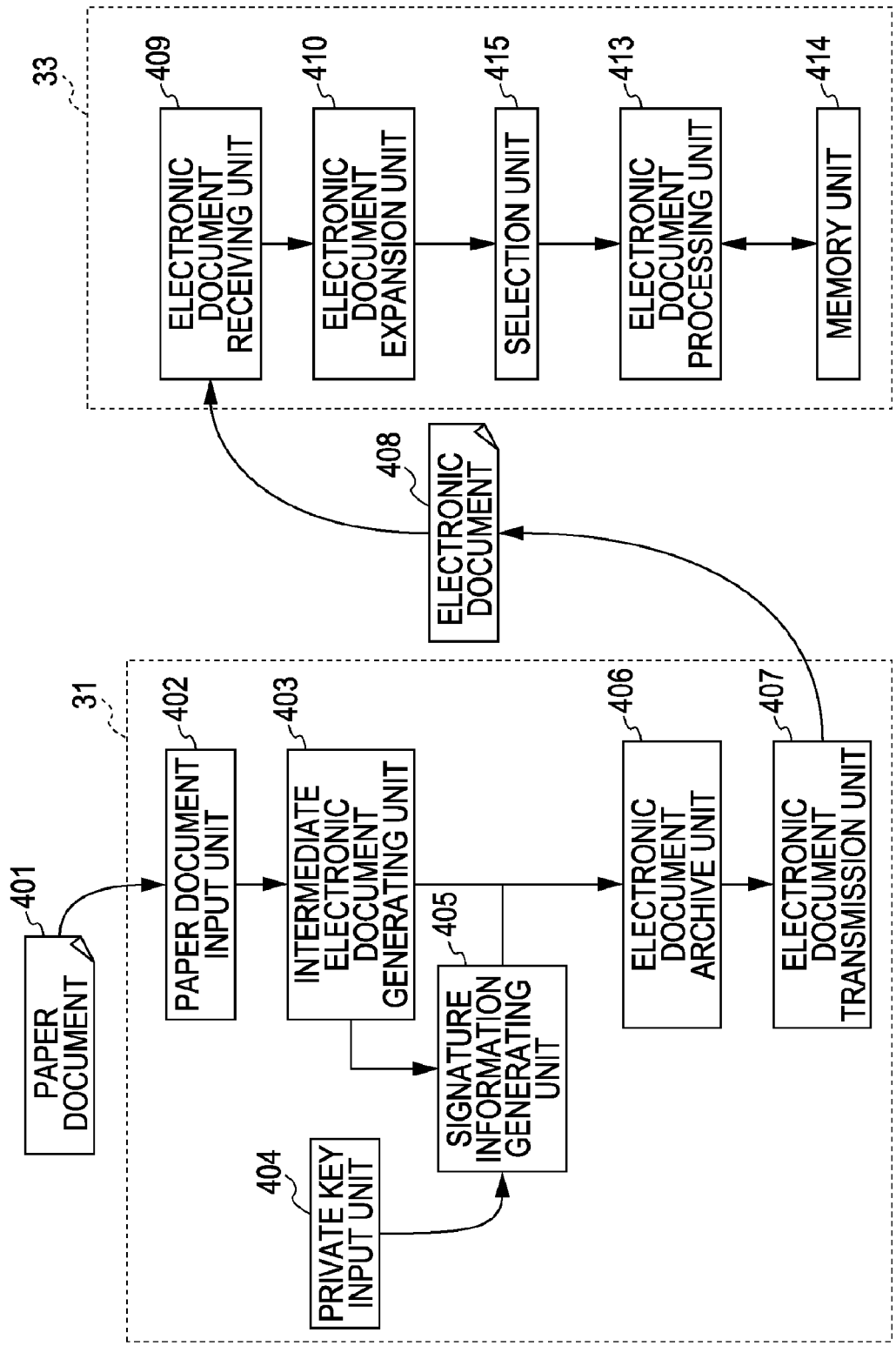

INFORMATION PROCESSING APPARATUS, INFORMATION PROCESSING METHOD, AND COMPUTER READABLE STORAGE MEDIUM

BACKGROUND OF THE INVENTION

1. Field of the Invention

The present invention relates to a technique for detecting alteration of digital data.

2. Description of the Related Art

Recently, with the rapid development and proliferation of computers and networks, various information such as text data, image data, and audio data have been digitalized. Digital data does not deteriorate with time, and therefore can remain in its original state. In addition, digital data can be easily copied, edited, and processed. Although the easy copying, editing, and processing of digital data are very useful for users, digital data security has become a major concern. Accordingly, security techniques for digital data have been rapidly becoming increasingly important.

As a technique that allows a recipient to detect whether received data has been altered, a digital signature technique has been proposed. The digital signature is additional data that is used for preventing original data from being altered. In addition, the digital signature technique can effectively prevent not only data alteration but also spoofing and repudiation on the Internet.

As disclosed in U.S. Pat. No. 5,898,779, a signature method intended for the verification of data included in a partial area of an image is proposed. The digital image signature method disclosed in U.S. Pat. No. 5,898,779 is performed as follows: first, selecting the ROI of an image; calculating the hash value of the selected ROI; generating a digital signature by encrypting the calculated hash value using a private key; and then attaching the digital signature to the image.

Currently, various electronic documents including digital data are used. When an electronic document is reused, the entire electronic document is typically not reused, instead a component of the electronic document is often reused. For example, the case can be considered where text data such as a predetermined word, sentence, line, or paragraph, predetermined image data, or predetermined graphic data is reused in such a manner that it is copied and is then attached to another document.

Although U.S. Pat. No. 5,898,779 describes the technique enabling verification of whether data of an area included in original image data has been altered, it does not disclose at all about reuse of a certain component included in the original image data. Therefore, it does not disclose a technique of affixing a signature to data that is reusing a certain component included in the original image data.

SUMMARY OF THE INVENTION

An embodiment of the present invention provides a method that enables verification of whether a component of original image data has been altered at the location at which the component is to be reused (e.g., pasted) without newly generating a signature.

According to an embodiment of the present invention, there is provided a method that includes the following: inputting first document data including a plurality of components and signature information corresponding to the components; selecting at least one component from among the components; extracting signature information corresponding to the at least one selected component; storing the at least one selected component and the signature information corresponding to the at least one selected component in a memory; and generating second document data using the at least one stored component and the stored signature information.

According to an embodiment of the present invention, there is further provided an information processing apparatus that includes the following: an input unit to input first document data including a plurality of components and signature information corresponding to the components; a selecting unit to select at least one component from among the components; an extracting unit to extract signature information corresponding to the at least one selected component; a storing unit to store the at least one selected component and the signature information corresponding to the at least one selected component; and a generating unit to generate second document data using the at least one stored component and the stored signature information.

According to an embodiment of the present invention, there is yet further provided a computer readable storage medium storing instructions which, when executed by a computer, causes the computer to perform operations including the following: receiving first document data including a plurality of components and signature information corresponding to the components; selecting at least one component from among the components; extracting signature information corresponding to the at least one selected component; storing the at least one selected component and the signature information corresponding to the at least one selected component in a memory; and generating second document data using the at least one stored component and the stored signature information.

Further features of the present invention will become apparent from the following description of exemplary embodiments with reference to the attached drawings. It is noted that the references to "an" or "one" embodiment of this disclosure are not necessarily directed to the same embodiment, and such references mean at least one.

BRIEF DESCRIPTION OF THE DRAWINGS

FIG. 5 is a flowchart showing intermediate electronic document generation processing according to an embodiment of the present invention.

FIG. 23 is a block diagram showing another electronic document generating device and another electronic document processing device according to the third embodiment of the present invention.

DESCRIPTION OF THE EMBODIMENTS

First, a digital signature, a hash function, public key encryption will be briefly described.

[Digital Signature]

Figure 11:
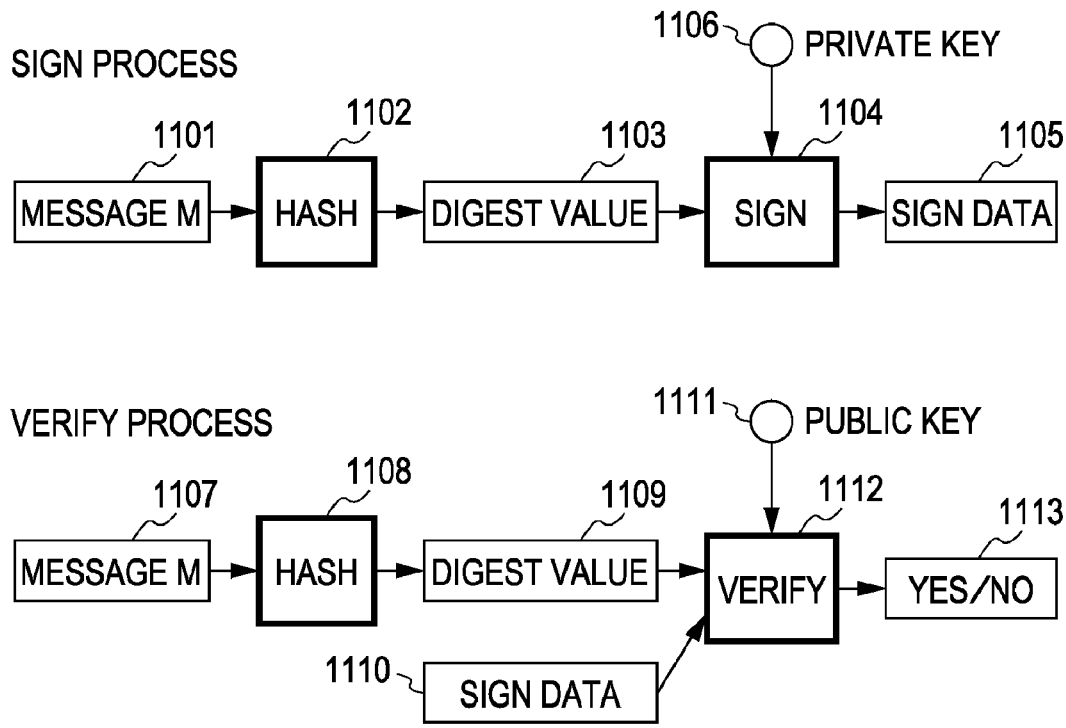
FIG. 11 is a data structural diagram of signature information according to an embodiment of the present invention.

A digital signature will be described with reference to FIG. 11. FIG. 11 is a schematic diagram showing signature generation processing and signature verification processing. A hash function and public key encryption are used in digital signature data generation. A transmitter performs hash processing 1102 upon input data M and calculates a digest value H(M) 1103 that is fixed length data. Subsequently the transmitter performs conversion processing 1104 upon the fixed length data H(M) 1103 using a private key Ks 1106, and creates digital signature data S 1105, and then transmits the digital signature data S 1105 and the input data M 1101 to a receiver.

In signature verification processing, the receiver verifies whether data acquired by performing conversion (decryption) processing 1112 upon digital signature data S 1110 using a public key Kp 1111 exactly corresponds to data 1109 acquired by performing hash processing 1108 upon input data M 1107. On the basis of a result 1113 of the above-described verification processing, if the two pieces of data are not the same, it can be determined that the data M has altered.

The RSA or DSA public key cryptosystem is used in the digital signature. The safety of the digital signatures is established on the basis of the premise that it is computationally difficult for an entity that does not have the required private key to counterfeit a digital signature or to decrypt the private key.

[Hash Function]

Next, a hash function will be described. The hash function used in the digital signature processing irreversibly compresses data to which a signature will be affixed (data to be signed), thereby shortening signature affixation processing time. That is, the hash function can convert the data M of predetermined length into fixed-length output data. Here, output data H(M) is defined as hash data for plaintext data M.

In particular, in the case of a one-way hash function, it is computationally difficult to calculate plaintext data M' that satisfies the following equation $H(M')=H(M)$. As the above-described one-way hash function, there are standard algorithms including MD2, MD5, and SHA-1.

[Public Key Encryption]

Next, public key encryption will be described. In the public key cryptosystem, two different keys are used. Encrypted data upon which encryption processing has been performed using one key can be decrypted only by using the other key. One key is referred to as a public key and is openly disclosed. The other key is referred to as a private key and is possessed only by its owner.

As the digital signature using the public key cryptosystem, there are the RSA, DSA, and Schnorr signatures.

First Exemplary Embodiment

In this embodiment, an electronic document is generated from a paper document so that signature information can be affixed to each component of the electronic document. Even if a component selected from among components of the electronic document and its signature information are copied and are then pasted into another electronic document, the signature information for the selected component can also work in the electronic document that is a paste location. This case will be described by way of example.

Figure 1:
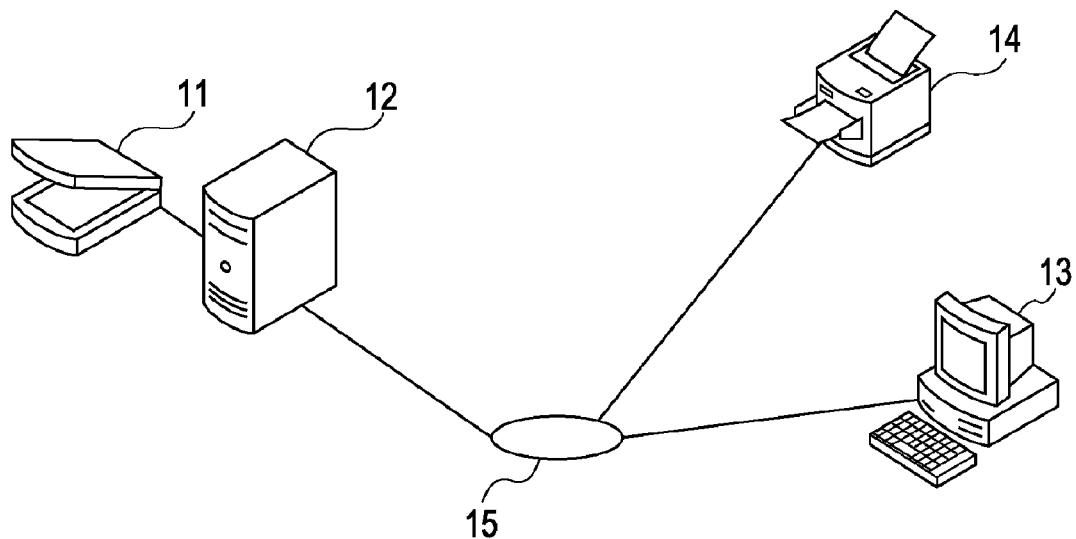
FIG. 1 is a schematic diagram of a system to which embodiments of the present invention can be applied.

FIG. 1 is a schematic diagram of an exemplary system to which embodiments of the present invention can be applied. Referring to the system shown in FIG. 1, a scanner 11, a computer device 12 for generating an electronic document, a computer device 13 for editing and processing an electronic document, and a printing device 14 for printing an electronic document are connected to a network 15.

Figure 2:
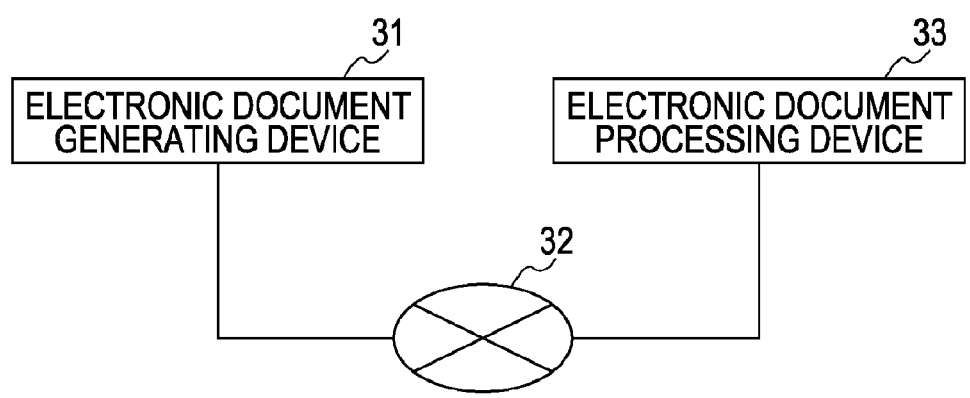
FIG. 2 is a block diagram showing a system according to an embodiment of the present invention.

FIG. 2 is a block diagram showing a system according to an embodiment of the present invention. An electronic document generating device 31 receives image data, and affixes signatures to the image data, and then transmits the image data affixed with the signatures as an electronic document to an electronic document processing device 33 via a network 32. The electronic document processing device 33 verifies, processes, edits, and prints received data.

Figure 3:
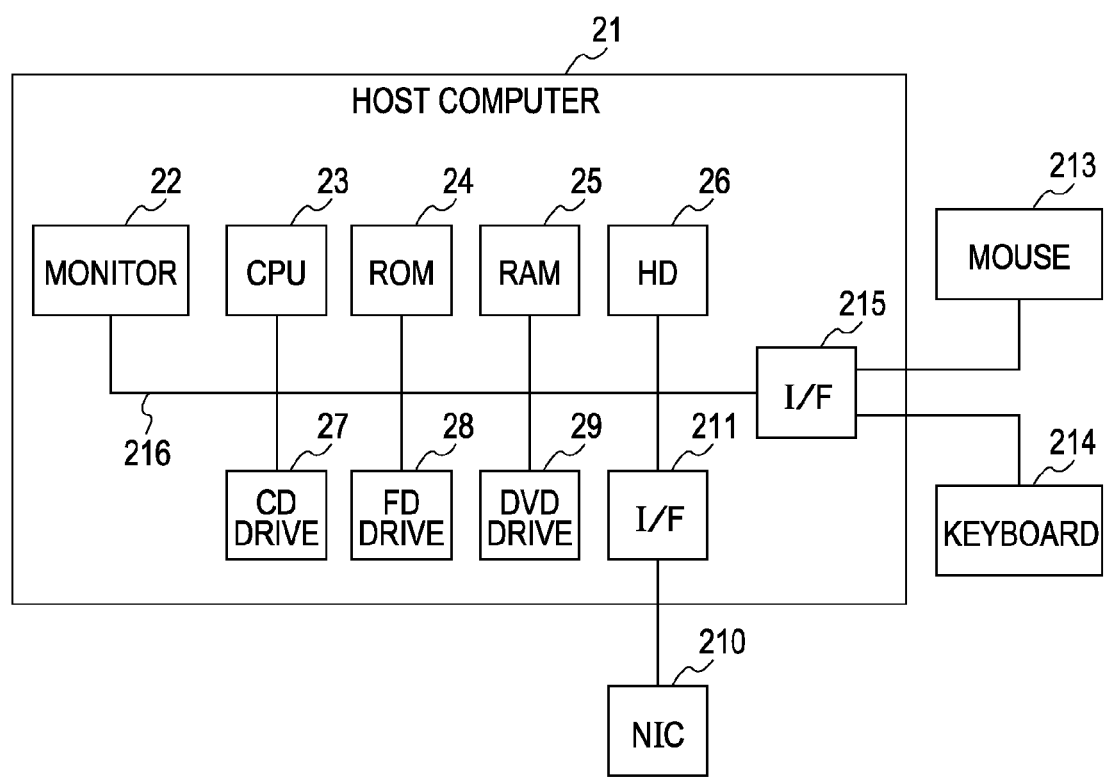
FIG. 3 is a diagram showing an example of a hardware configuration of a host computer according to an embodiment of the present invention.

A host computer applicable to an embodiment will be described with reference to FIG. 3. FIG. 3 is a diagram showing the basic configuration of a host computer that functions as the electronic document generating device 31 and electronic document processing device 33 according to this embodiment and showing the relationship between the host computer and peripherals thereof. Referring to FIG. 3, a host computer 21 serving as, for example, a personal computer can perform the following operations: storing image data in a hard disk (HD) 26 or a medium in a CD drive 27, an FD drive 28, or a DVD drive 29, respectively; displaying the stored image data on a monitor 22; and transmitting the image data via the Internet using an NIC 210. Various instructions are input to the host computer 21 by a user using a mouse 213 and a keyboard 214. In the host computer 21, blocks, described later, are connected to each other via a bus 216, whereby various data exchanges can be achieved.

The monitor 22 can display various information transmitted from the host computer 21.

A CPU 23 can control the operation of each unit included in the host computer 21, and execute a program loaded in a RAM 25. A ROM 24 stores a BIOS and a boot program. The RAM 25 temporarily stores a program and image data which will be processed in the CPU 23. An OS and a program that is used by the CPU 23 for performing the following various kinds of processing are loaded in the RAM 25.

The HD 26 is used for the storage of the OS and a program which will be transmitted to the RAM 25, and is used by the host computer 21 for storing image data therein or reading out image data therefrom during its operation. The CD drive 27 can read data stored on a CD-ROM (CD-R), one of external storage media, and write data onto a CD-R.

Like the CD drive 27, the FD drive 28 can read data stored on a FD and write data onto a FD, and the DVD drive 29 can read data stored on a DVD-ROM (DVD-RAM) and write data onto a DVD-RAM. If an image processing program is stored on a CD-ROM, FD, or DVD-ROM, the program is read out from it and is then installed in the HD 26. Subsequently, the program is transmitted to the RAM 25 as appropriate.

An I/F 211 connects the NIC 210 to the host computer 21. The NIC 210 enables transmission of image data stored in the RAM 25, HD 26, or in a medium in the CD drive 27, FD drive 28, or DVD drive 29 to a network such as the Internet. The host computer 21 transmits data to the Internet via the I/F 211 or receives data from the Internet via the I/F 211.

An I/F 215 connects the mouse 213 and the keyboard 214 to the host computer 21. Via the I/F 215, various instructions input using the mouse 213 and the keyboard 214 are transmitted to the CPU 23.

Figure 4:
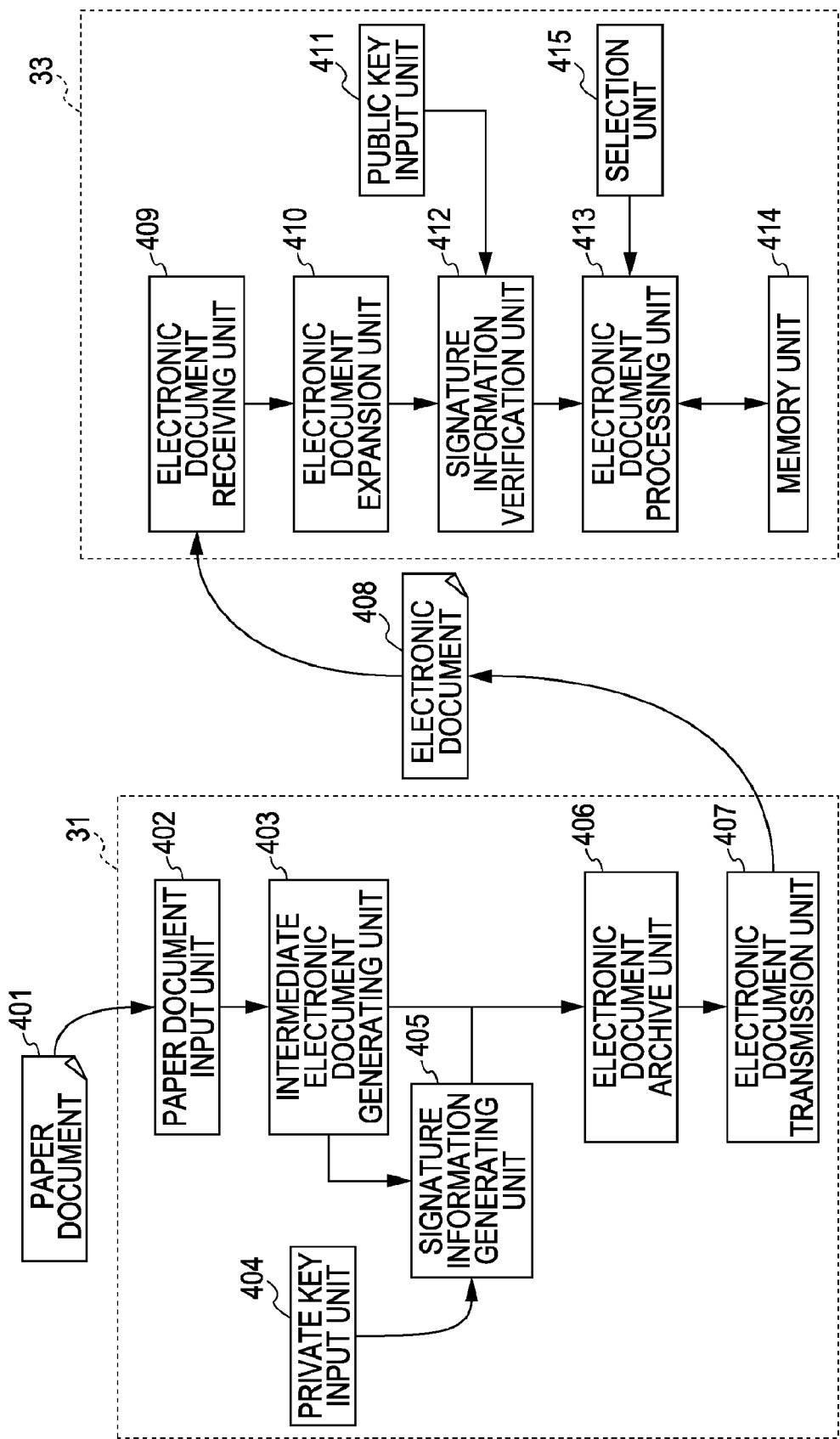
FIG. 4 is a block diagram showing an electronic document generating device and an electronic document processing device according to a first embodiment of the present invention.

FIG. 4 is a functional block diagram of the electronic document generating device 31 and electronic document processing device 33 according to an embodiment of the present invention.

The electronic document generating device 31 is provided with the following components: a paper document input unit 402 for receiving a paper document 401; an intermediate electronic document generating unit 403 for analyzing the paper document 401 and generating an intermediate electronic document; a private key input unit 404; a signature information generating unit 405 for generating signature information using the intermediate electronic document and a private key received from the private key input unit 404; an electronic document archive unit 406; and an electronic document transmission unit 407 for transmitting the electronic document.

The electronic document processing device 33 is provided with the following components: an electronic document receiving unit 409 for receiving an electronic document 408; an electronic document expansion unit 410 for expanding the electronic document 408 and acquiring the intermediate electronic document and signature information thereof; a public key input unit 411; a signature information verification unit 412 for performing verification processing using the intermediate electronic document, the signature information, and a public key received from the public key input unit 411; an electronic document processing unit 413 for, for example, processing, editing, or printing the expanded electronic document; a memory unit 414; and a selection unit 415 for selecting a component to be processed.

Processing performed in the intermediate electronic document generating unit 403 will be described in detail with reference to FIG. 5. FIG. 5 is a flowchart showing the processing of the intermediate electronic document generating unit 403 in FIG. 4 according to an embodiment of the present invention.

Figure 6A:
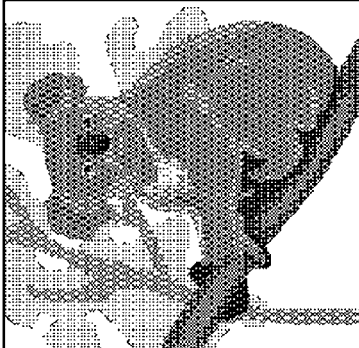
FIG. 6A is a diagram showing exemplary data converted into electronic form.

In step S501, data transmitted from the paper document input unit 402 is converted into electronic form. FIG. 6A is a diagram showing exemplary data 601 converted into electronic form.

In step S502, the area of the electronic data is divided on the basis of attributes thereof. The attributes include, for example, character, photograph, table, and line drawing. More specifically, clusters of black pixels and clusters of white pixels are extracted. On the basis of the feature amounts of these clusters such as their shapes, sizes, or aggregation states, the area of the electronic data is divided into sub-areas provided with feature names such as character, picture, table, frame, line, etc.

Figure 6B:
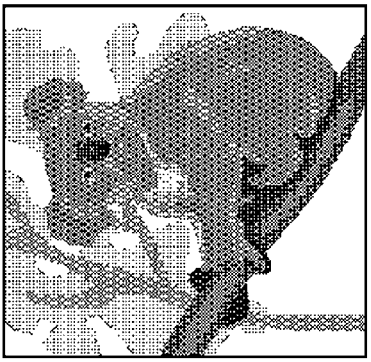
FIG. 6B is a diagram showing an exemplary result of area division.

For example, FIG. 6B is a diagram showing an exemplary result of the area division in which the area of the electronic data is divided in accordance with attribute discrimination based on extracted feature amounts. The attributes of sub-areas 602, 604, 605, and 606 are character, and the attribute of a sub-area 603 is color photograph.

In step S503, document information is generated for each sub-area acquired in step S502. The document information includes an attribute, layout information such as position coordinates in a page, a character code string in the case where the attribute of a sub-area is character, and document logical construction of, for example, a paragraph or title.

In step S504, transmission information conversion processing is performed upon each sub-area acquired in step S502. The transmission information indicates information required for rendering processing. More specifically, each sub-area is converted into a raster image whose resolution is variable, a vector image, a monochrome image, or a color image. The transmission information includes the file size information thereof. In addition, if the attribute of a sub-area is character, the transmission information includes text information that is a result of character recognition processing, position information of each character, font information, and reliability information of characters acquired by the character recognition processing.

In FIG. 6B, the character sub-areas 602, 604, 605, and 606 are converted into vector images, and the color photograph sub-area 603 is converted into a color raster image.

In step S505, a sub-area acquired by the area division processing performed in step S502, the document information of the sub-area generated in step S503, and the transmission information of the sub-area acquired by the transmission information conversion processing performed in step S504 are associated with each other. The associated information is represented in a tree structure form. Here, the transmission information and the document information are referred to as components.

In step S506, components generated in steps S501 through S505 are stored as an intermediate electronic document. The storage format may be any format that enables tree structure representation. In this embodiment, an XML format that is one format of structured documents is used.

Figure 10:
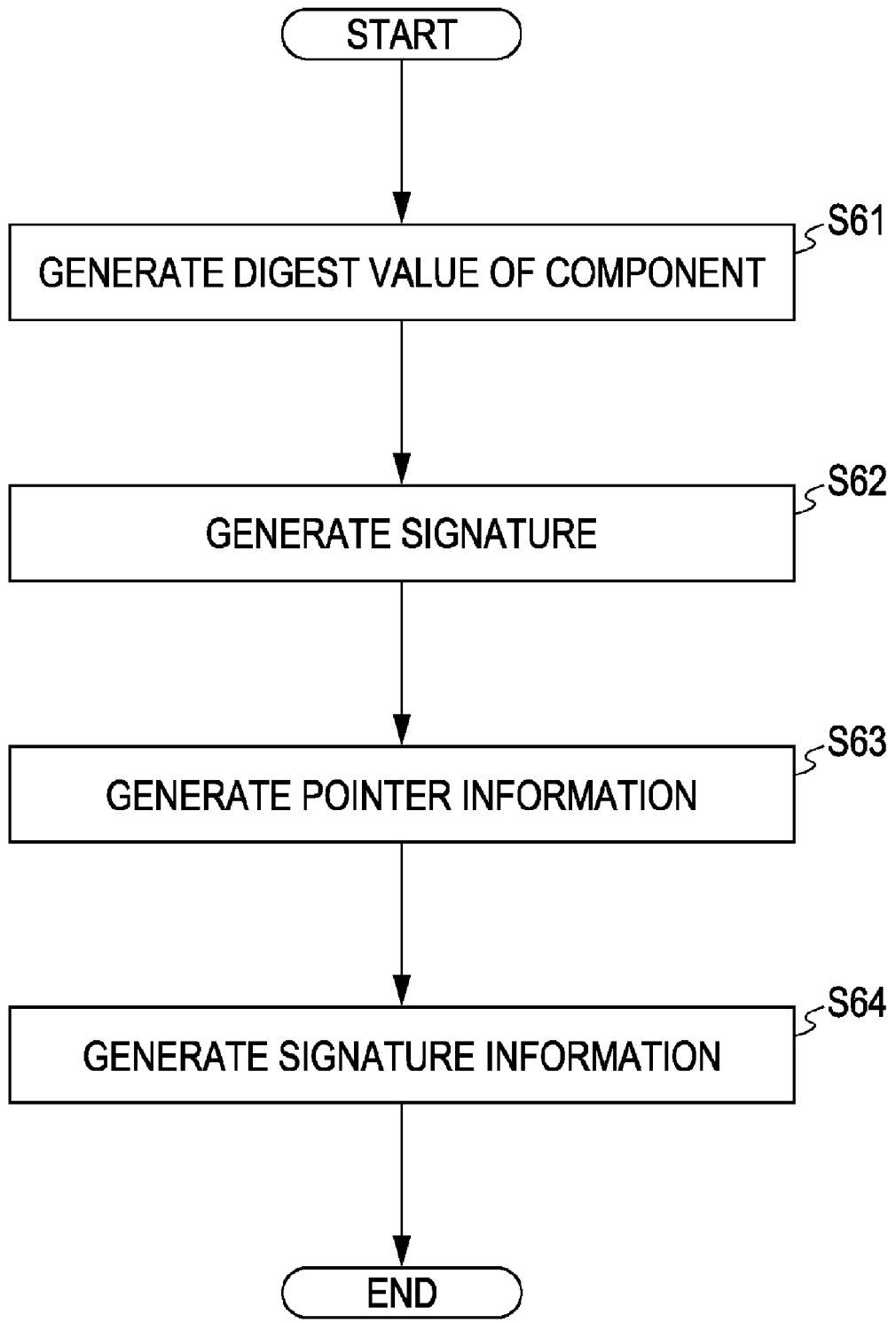
FIG. 10 is a flowchart showing signature information generation processing according to the first embodiment of the present invention.

The detailed description of the signature information generating unit 405 will be provided with reference to FIG. 10. FIG. 10 is a flowchart showing processing performed in the signature information generating unit 405 in FIG. 4 according to an embodiment of the present invention.

In step S61, the digest value of each component is generated. Here, the component indicates data to be signed included in the intermediate electronic document, and is, for example, transmission information a 701, transmission information b 702, or document information 703 shown in FIG. 7A. In this embodiment, a hash function is used for the digest value generation.

In step S62, a digital signature is calculated by performing signature processing upon the digest value of a component which has been generated in step S61 using a private key received from the private key input unit 404.

In step S63, pointer information of each component is generated. The pointer information may be any information that allows each component to be uniquely identified. For example, in this embodiment, the URI defined in RFC2396 is used as the pointer information. However, it is obvious that the present invention is not limited thereto and various values may be used as identification information. For example, the URL or address information may be used.

In step S64, signature information is generated using the digital signature generated in step S62 and the pointer information generated in step S63, and then the signature generation process ends. That is, in this embodiment, the signature information includes the pointer information of a component and the digital signature corresponding to the pointer information. Here, the signature information may be generated for all components, or may be generated only for a component selected using the keyboard or mouse.

Figure 7B:
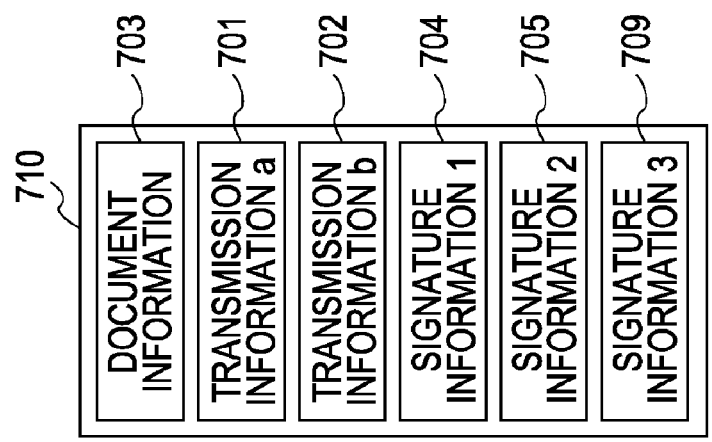
FIG. 7B is a diagram showing an exemplary electronic document according to the first embodiment of the present invention.
Figure 7A:
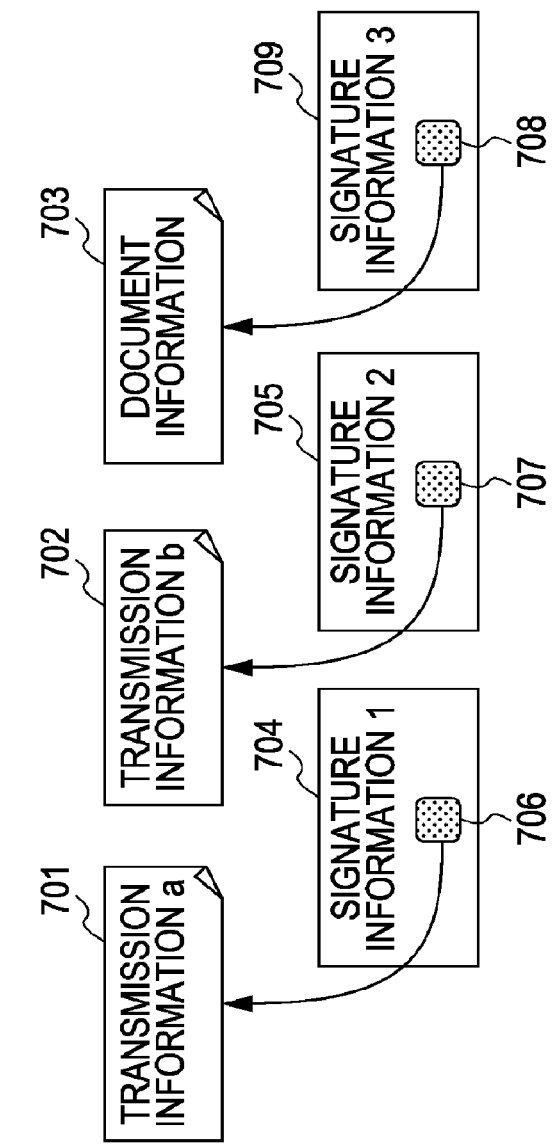
FIG. 7A is a diagram showing an exemplary intermediate electronic document attached with signature information according to the first embodiment of the present invention.

Next, the electronic document archive unit 406 will be described with reference to FIGS. 7A and 7B. Referring to FIGS. 7A and 7B, the transmission information a 701 and transmission information b 702 for the intermediate electronic document generated in the intermediate electronic document generating unit 403, the document information 703, signature information 704, 705, and 709 generated in the signature information generating unit 405 are shown. As described previously, the signature information includes the pointer information that indicates transmission information or document information corresponding to a component. In FIG. 7A, the signature information 704, 705, and 709 have pointer information 706, 707, and 708 that indicate the transmission information a 701 and transmission information b 702, and the document information 703, respectively.

As shown in FIG. 7A, the intermediate electronic document generated in the intermediate electronic document generating unit 403 and the signature information generated in the signature information generating unit 405 separately exist as the transmission information, document information, and signature information. In the electronic document archive unit 406, the six pieces of information shown in FIG. 7A are archived and stored in one electronic document. FIG. 7B is a schematic diagram showing an exemplary electronic document in which the intermediate electronic document and the signature data are archived. Archive data 710 corresponds to the electronic document 408 shown in FIG. 4.

In the electronic document expansion unit 410, the archive data 710 is expanded, whereby the intermediate electronic document and the signature information are individually present as shown in FIG. 7A.

Figure 13:
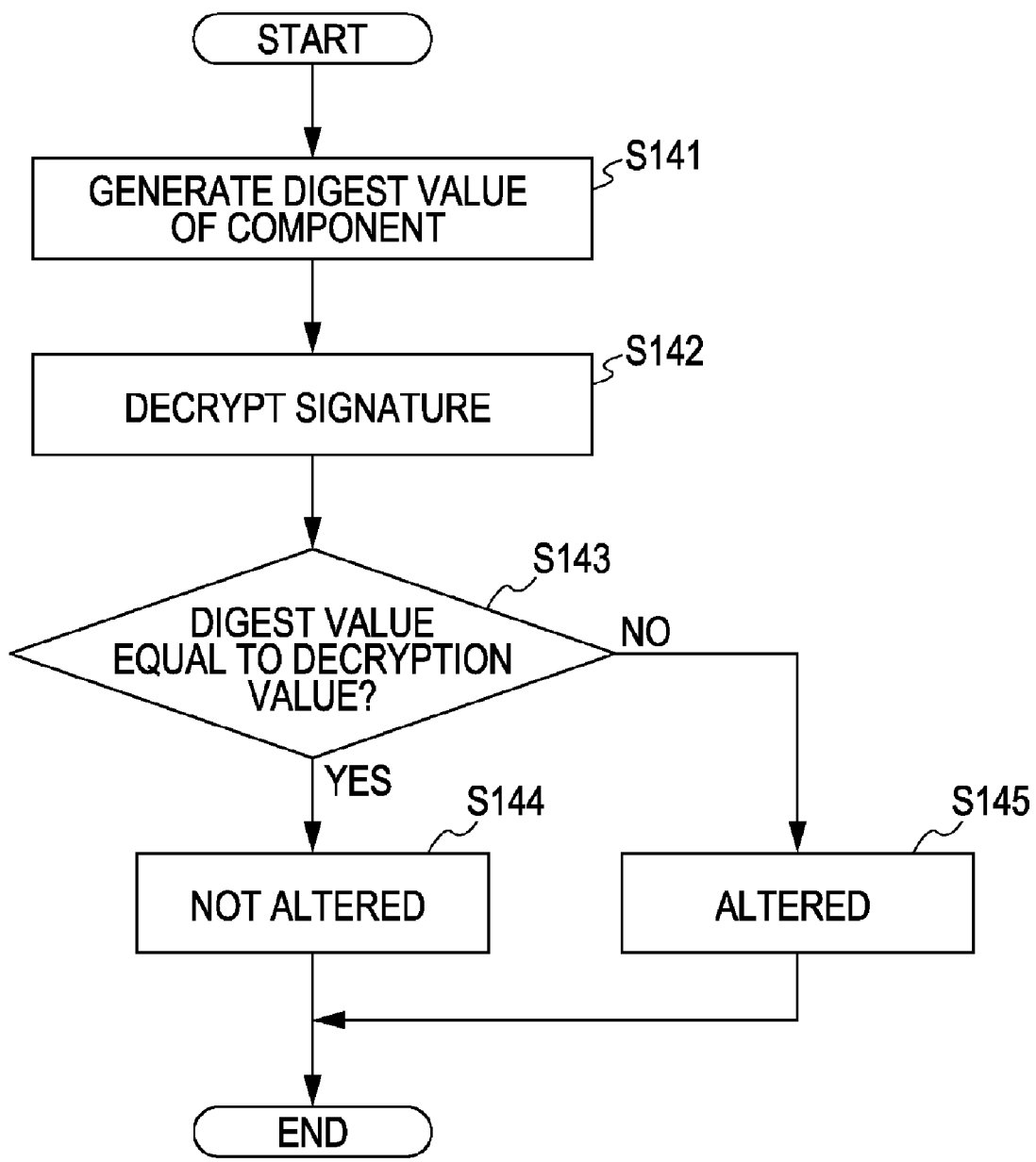
FIG. 13 is a flowchart showing signature information verification processing according to the first embodiment of the present invention.

The processing performed in the signature information verification unit 412 will be described in detail with reference to FIG. 13. FIG. 13 is a flowchart showing signature information verification processing according to an embodiment of the present invention.

In step S141, a digest value of a component is calculated. For example, in the example shown in FIG. 7A, the digest value is generated from the transmission information or document information.

In step S142, the digital signature included in the signature information is decrypted using a public key received from the public key input unit 411. This public key corresponds to the private key used for generating the digital signature.

In step S143, the digest value calculated in step S141 is compared with the value acquired by the decryption processing performed in step S142. If these two values are the same ("Yes" in step S143), the process proceeds to step S144 where it is determined that alteration has not been performed. If these two values are not the same ("No" in step S143), the process proceeds to step S145 where it is determined that alteration has been performed.

Figure 8:
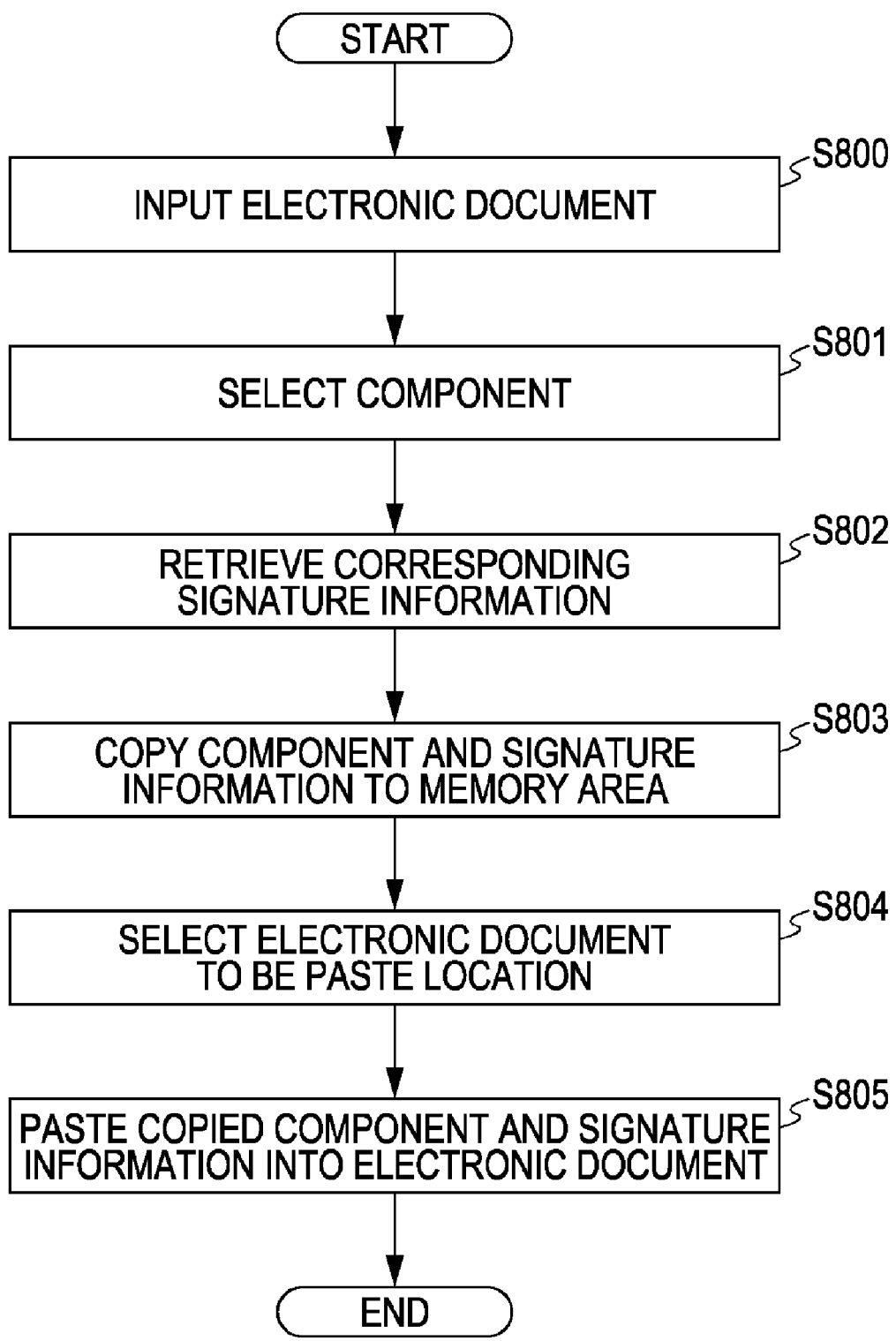
FIG. 8 is a flowchart showing copy and paste editing according to the first embodiment of the present invention.
Figure 9:
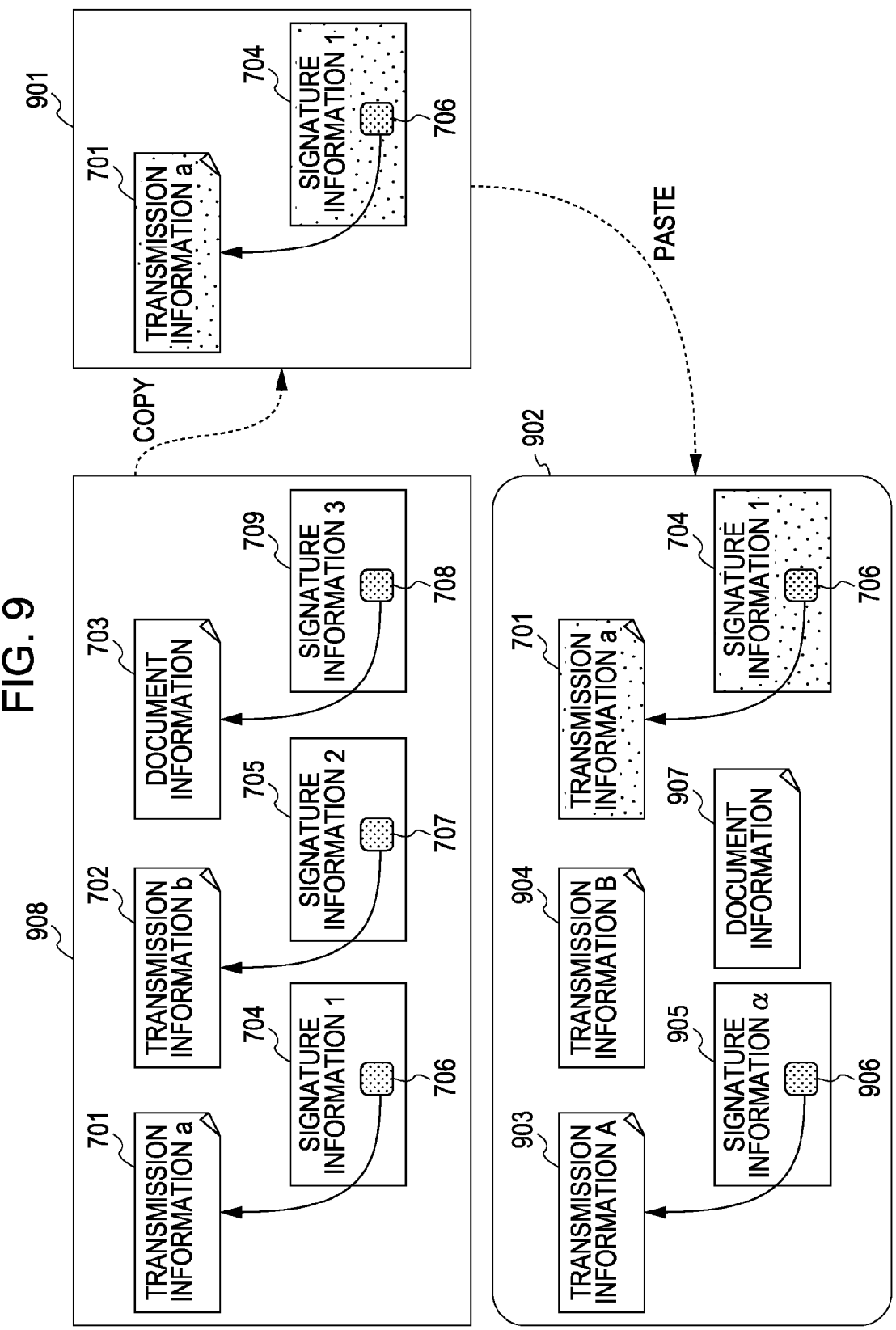
FIG. 9 is a conceptual diagram showing the copy and paste editing according to an embodiment of the present invention.

Processing performed in the electronic document processing unit 413 will be described in detail with reference to FIG. 8. FIG. 8 is a flowchart showing copy and paste editing among electronic document processing according to an embodiment of the present invention. FIG. 9 is a conceptual diagram for describing the copy and paste editing according to an embodiment of the present invention. Here, the copy editing may be cut editing.

In step S800, an electronic document including components subjected to the copy and paste editing is input. For example, referring to FIG. 9, an electronic document 908 corresponds to the electronic document including components subjected to the copy and paste editing. Since components included in the electronic document 908 are the same as those shown in FIG. 7A, the description thereof will be omitted.

In step S801, a component subjected to the copy and paste editing is selected from the selection unit 415. For example, suppose that the transmission information a 701 shown in FIG. 9 is selected as the component subjected to the copy and paste editing. The selection method is drawing a box around the area of interest in the electronic document or pointing and clicking on the area of interest by using a pointing device such as the mouse 213. Alternatively, the coordinate information on the area where the component of interest is present, or the attribute or transmission information of the component of interest may be directly input using the keyboard 214. In one embodiment, only the component determined in step S144 shown in FIG. 13 to be a component upon which alteration was not performed may be selected. In addition, one component may be selected or a plurality of components may be selected.

In step S802, signature information corresponding to the component selected in step S801 is retrieved (extracted). As described previously, the signature information has pointer information of a corresponding component. Therefore, signature information including the pointer information of the component selected in step S801 is retrieved from among all signature information. For example, if the transmission information a 701 shown in FIG. 9 is selected in step S801, signature information including the pointer information of the transmission information a 701 is retrieved from signature information 704, 705 and 709. In FIG. 9, the signature information 704 is retrieved (extracted) as signature information corresponding to the transmission information a 701.

In step S803, the component selected in step S801 and the signature information retrieved in step S802 are copied to the memory unit 414. The memory unit 414 can be used along with an operating system and an application that handles the electronic document 908, which is a copy source, and an electronic document 902, which is a paste location. The copied data is retrieved when the data is to be pasted.

For example, if the transmission information a 701 and the signature information 704 corresponding to the transmission information a 701 which are included in the electronic document 908 shown in FIG. 9 are copied, first, the data volumes of the transmission information a 701 and the signature information 704 are checked, and then a memory area 901 is reserved in the memory unit. Next, the transmission information a 701 and the signature information 704 are copied to the reserved memory area 901. In step S804, an electronic document into which objects will be pasted is selected. For example, the electronic document 902 including transmission information A 903 and B 904, signature information α 905, and document information 907 is selected. However, a new electronic document that does not include any components may be selected.

In step S805, the component and signature information copied in step S803 is pasted into the electronic document selected in step S804.

Figure 12:
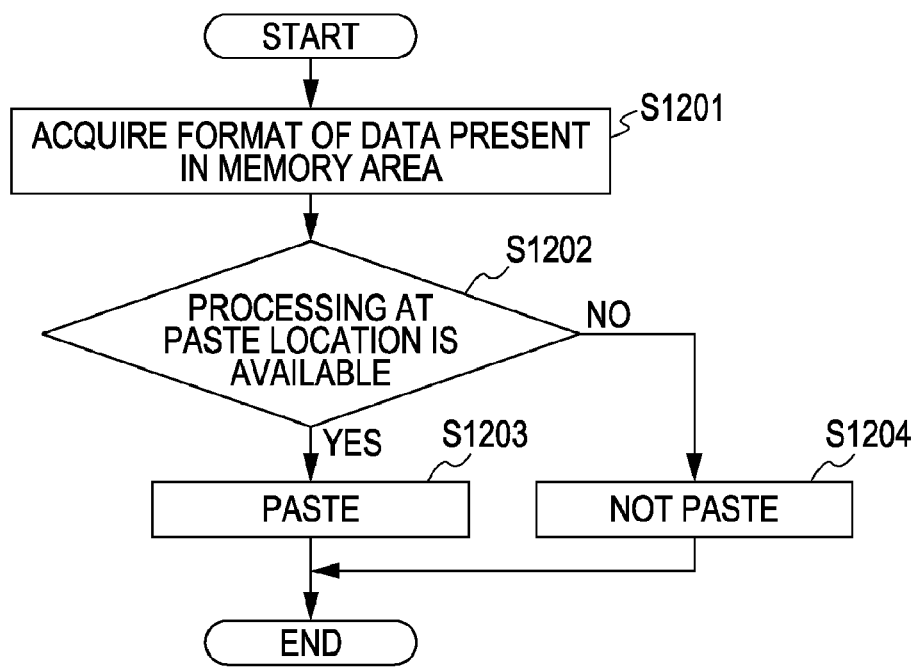
FIG. 12 is a flowchart showing the details of paste processing performed in step S805 in FIG. 8 according to an embodiment of the present invention.

The paste processing performed in step S805 will be described with reference to FIG. 12. FIG. 12 is a flowchart showing the details of paste processing performed in step S805 in FIG. 8 according to an embodiment of the present invention.

In step S1201, the data format of an object included in a memory area (the memory area 901 shown in FIG. 9) reserved in a memory unit is acquired.

In step S1202, it is determined whether the acquired data format can be handled in an electronic document into which the object will be pasted. For example, if the acquired data format is a digital signature, it is determined whether this signature information can be verified in an electronic document into which the digital signature will be pasted.

In step S1202, in the case of YES, the process proceeds to step S1203, and data is pasted into an electronic document that is a paste location. In step S1202, in the case of NO, the process proceeds to step S1204, and data is not pasted.

For example, in FIG. 9, it was determined that both the transmission information a 701 and the signature information 704 could be handled in the electronic document 902 that is a paste location. Accordingly, the transmission information a 701 and the signature information 704 have been pasted into the electronic document 902.

As described above, according to this embodiment, when a component is copied, signature information corresponding to the component is retrieved using pointer information. Accordingly, both the component and the corresponding signature information can be copied.

Furthermore, according to this embodiment, when a component is pasted, both the component and signature information corresponding to the component are pasted. Accordingly, it can be verified at a paste location whether the component has been altered without newly generating a signature. The signature verification performed at the paste location can be achieved in accordance with the same processing as the verification processing shown in FIG. 11.

In this embodiment, when signature information corresponding to a component is retrieved, the pointer information of all signature information included in an electronic document is retrieved. However, another retrieval method can be considered. For example, in the signature information generation, a table showing correspondence between components and signature information (FIG. 14) is generated and is then included in the electronic document 408. Subsequently, in the electronic document processing, signature information corresponding to a component can be acquired by referring to the correspondence table included in the electronic document 408. In this case, the use of the correspondence table leads to the enhancement of processing speed of corresponding signature information acquisition. A correspondence table shown in FIG. 14 was made for the electronic document shown in FIG. 7A.

Second Exemplary Embodiment

In the first embodiment, signature information is generated for each component. In this embodiment, the case where an XML Signature is used will be described by way of example. W3C (the World Wide Web Consortium) fosters the standardization of the XML Signature.

More specifically, an electronic document including signature information compliant with the XML Signature specification is generated from a paper document. A component is selected from among components included in the electronic document, and is then copied and pasted along with the signature information thereof such that the signature information of the selected component can work properly in an electronic document to which the selected component is pasted. This case will be described.

Figure 20:
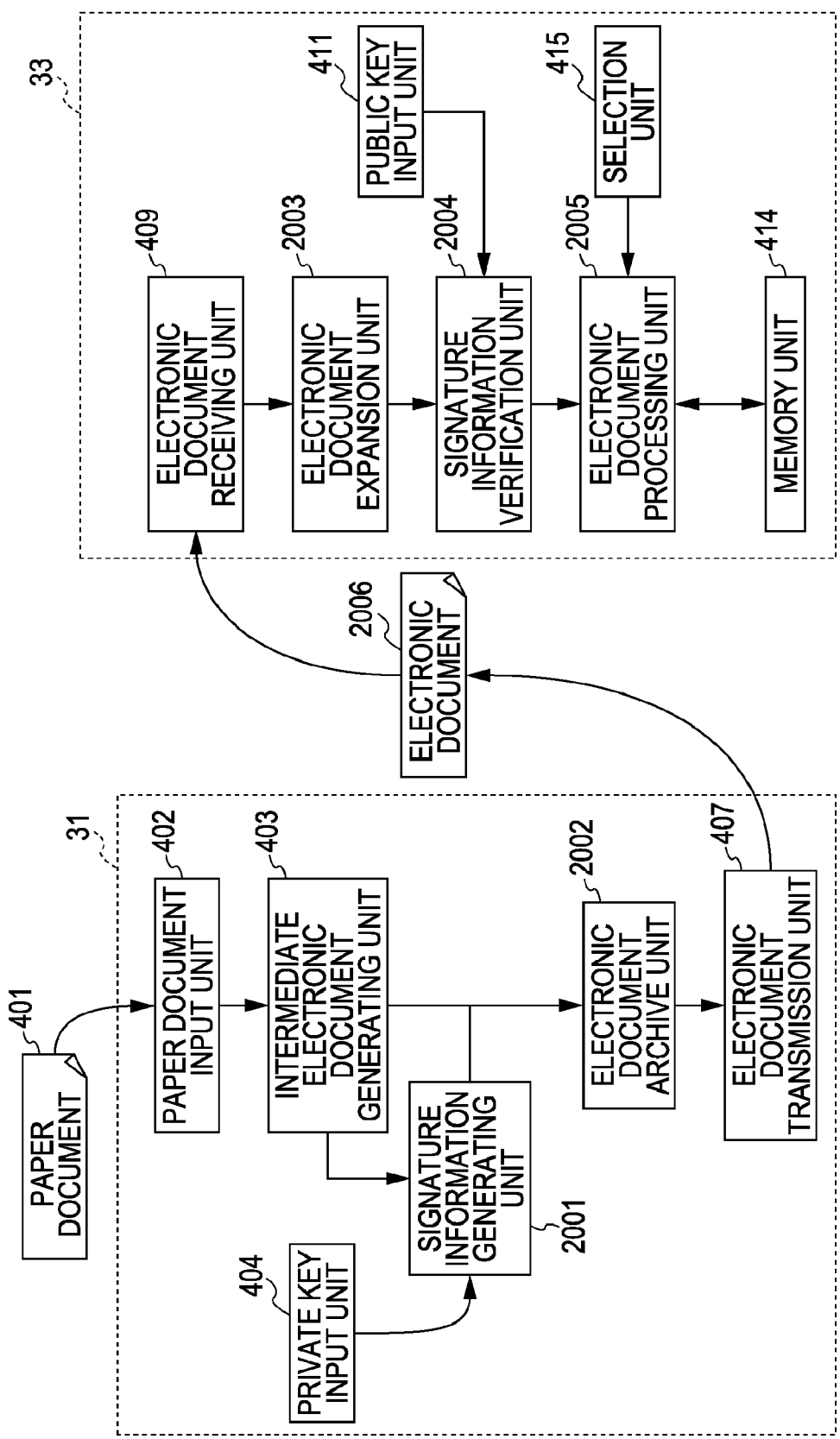
FIG. 20 is a block diagram showing an electronic document generating device and an electronic document processing device according to the second embodiment of the present invention.

FIG. 20 is a block diagram showing an electronic document generating device 31 and an electronic document processing device 33 according to the second embodiment. The configurations and processing procedures of a signature information generating unit 2001, an electronic document archive unit 2002, an electronic document expansion unit 2003, a signature information verification unit 2004, and an electronic document processing unit 2005 differ from those of the first embodiment. Only the different points will be described in detail.

XML Signature processing performed in the signature information generating unit 2001 will be described in detail.

Figures 14, 15:
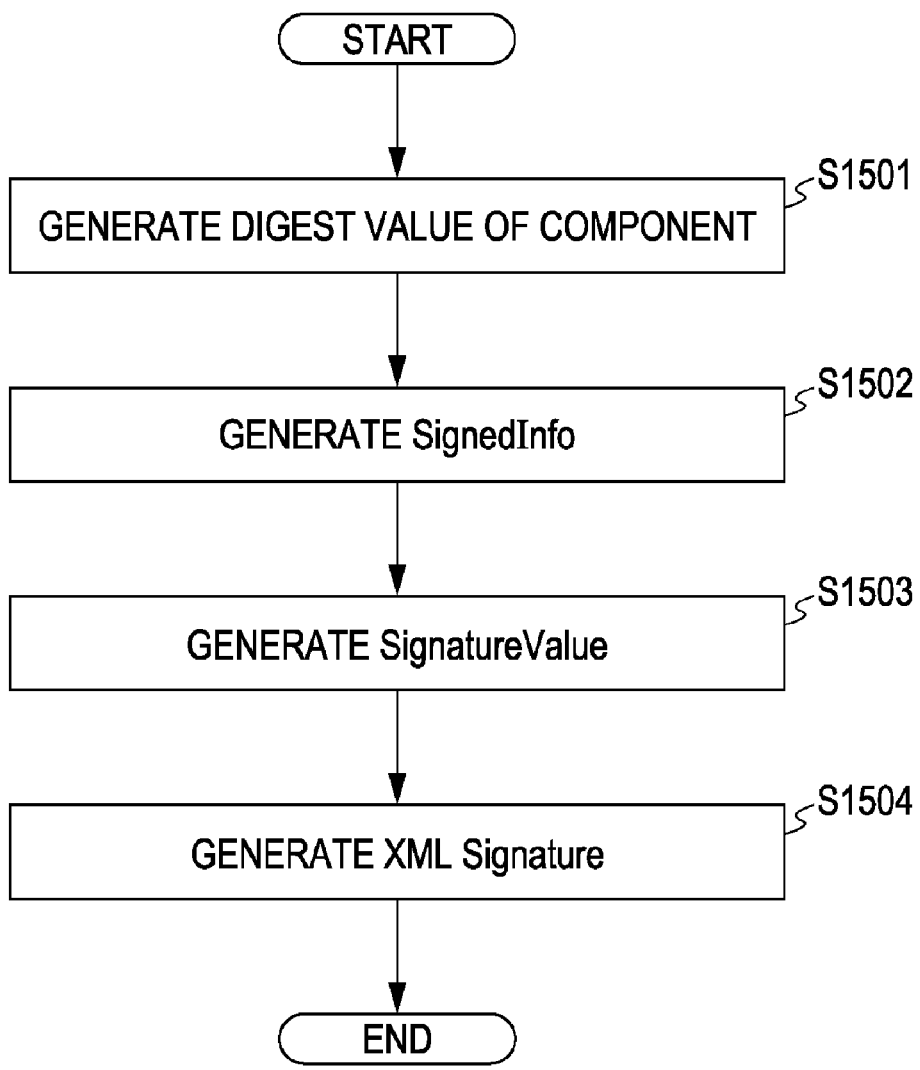
FIG. 14 is a table showing correspondence between components and signature information according to an embodiment of the present invention.
FIG. 15 is a flowchart showing signature information generation processing according to a second embodiment of the present invention.
Figure 16:
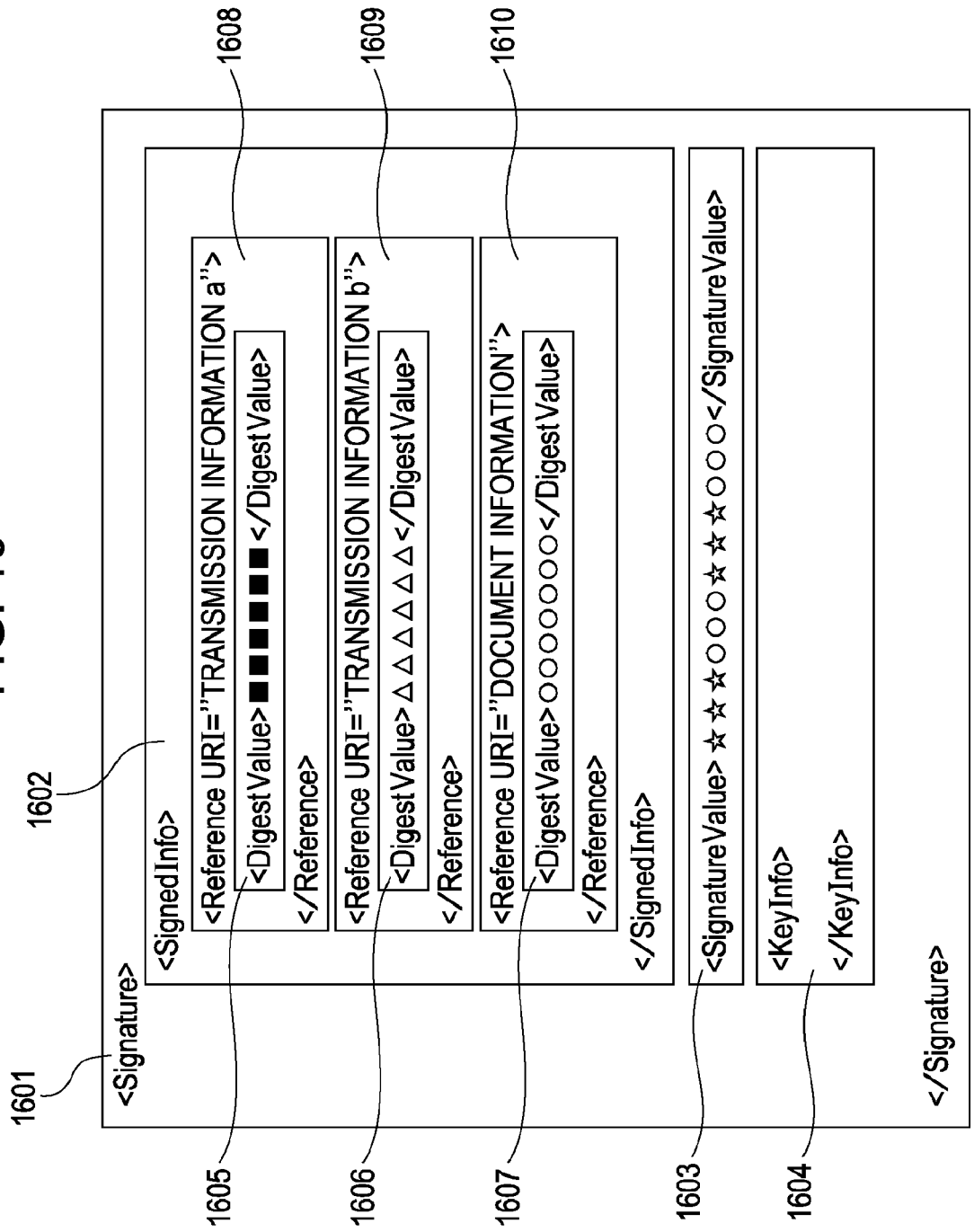
FIG. 16 is a schematic diagram showing signature information generated in an XML Signature format according to the second embodiment of the present invention.

FIG. 15 is a flowchart showing processing performed in the signature information generating unit 2001 according to the second embodiment. FIG. 16 is a schematic diagram showing signature information generated in the XML Signature format according to the second embodiment.

In step S1501, the digest value of each component is generated. The processing performed in step S1501 is generally the same as that performed in step S61 shown in FIG. 10, and therefore the description thereof will be omitted.

In step S1502, a SignedInfo 1602 is generated. The SignedInfo 1602 includes the digest values generated in step S1501 (DigestValues 1605, 1606, and 1607 shown in FIG. 16) as subelements for References (References 1608, 1609, and 1610 shown in FIG. 16). The References include URIs corresponding to the pointer information of individual components.

The References have a one-to-one correspondence with the components. In the SignedInfo, in addition to the References, a signature algorithm (not shown) and a canonicalization algorithm (not shown) which are compliant with the XML Signature specification are written.

In step S1503, a SignatureValue is generated. The SignatureValue (SignatureValue 1603 shown in FIG. 16) is a signature value acquired by performing signature processing upon the SignedInfo 1602 generated in step S1502 using a private key received from the private key input unit 404.

In step S1504, an XML Signature is generated. The SignedInfo 1602, the SignatureValue 1603, and a KeyInfo 1604 which is information on a public key used for verification of the SignatureValue, and other information (not shown) compliant with the XML Signature specification are written, and then the signature generation process ends.

That is, the signature information in this embodiment includes digest values of individual components, pointer information, and the digital signature for all of them.

Data generated in the electronic document archive unit 2002 will be described with reference to FIGS. 17A and 17B.

Figure 17:
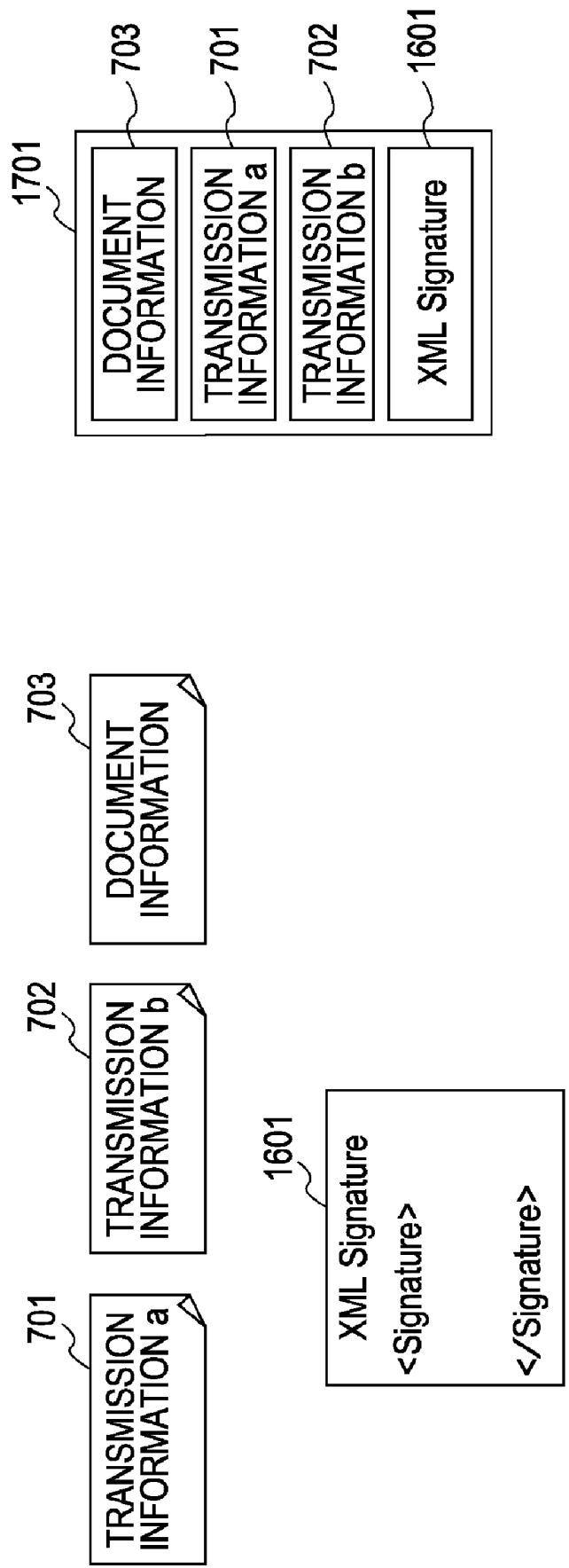
FIG. 17A is an exemplary intermediate electronic document attached with signature information according to the second embodiment of the present invention.
FIG. 17B is an exemplary electronic document according to the second embodiment of the present invention.

Referring to FIGS. 17A and 17B, the transmission information a 701 and transmission information b 702 generated in the intermediate electronic document generating unit 403, the document information 703, and an XML Signature 1601 generated in the signature information generating unit 2001 are shown.

As shown in FIG. 17A, the intermediate electronic document generated in the intermediate electronic document generating unit 403 and the signature information generated in the signature information generating unit 2001 separately exist as the transmission information, document information, and signature information.

There are different XML Signature forms depending on the method used to specify data to be signed using an URI. In this embodiment, the detached signature form in which signature information is detached from components is used.

In the electronic document archive unit 2002, the three pieces of information and the XML Signature shown in FIG. 17A are archived and stored in one electronic document. FIG. 17B is a schematic diagram showing an exemplary electronic document in which the intermediate electronic document and the signature data are archived. Archive data 1701 corresponds to the electronic document 2006 shown in FIG. 20.

In the electronic document expansion unit 2003, the archive data 1710 is expanded, whereby the intermediate electronic document and the signature information are individually present as shown in FIG. 17A.

The processing performed in the signature information verification unit 2004 will be described in detail with reference to FIGS. 18 and 19. There are two steps in XML Signature verification processing, a step of verifying whether the XML Signature itself has not been altered, and a step of verifying whether the component has not been altered.

Figure 18:
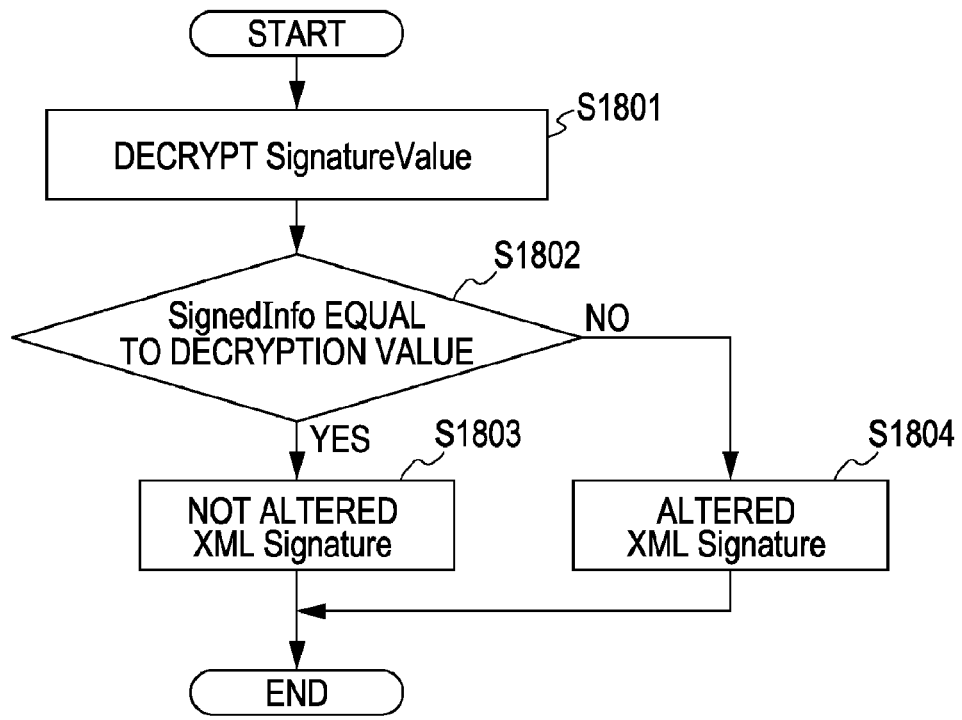
FIG. 18 is a flowchart showing XML Signature verification processing according to the second embodiment of the present invention.

FIG. 18 is a flowchart showing the XML Signature verification processing according to an embodiment of the present invention.

In step S1801, the SignatureValue 1603 included in the XML Signature 1601 is decrypted using a public key received from the public key input unit 411. In the example shown in FIG. 16, the SignatureValue 1603 is decrypted using a public key obtained on the basis of public key information included in the KeyInfo 1604.

In step S1802, the SignedInfo 1602 included in the XML Signature 1601 is compared with the value acquired by the decryption processing performed in step S1801. If they are the same ("Yes" in step S1802), the process proceeds to step S1803 where it is determined that alteration has not been performed. If the SignedInfo 1602 is not the same as the value acquired by the decryption processing performed in step S1801 ("No" in step S1802), the process proceeds to step S1804 where it is determined that alteration has been performed.

Figure 19:
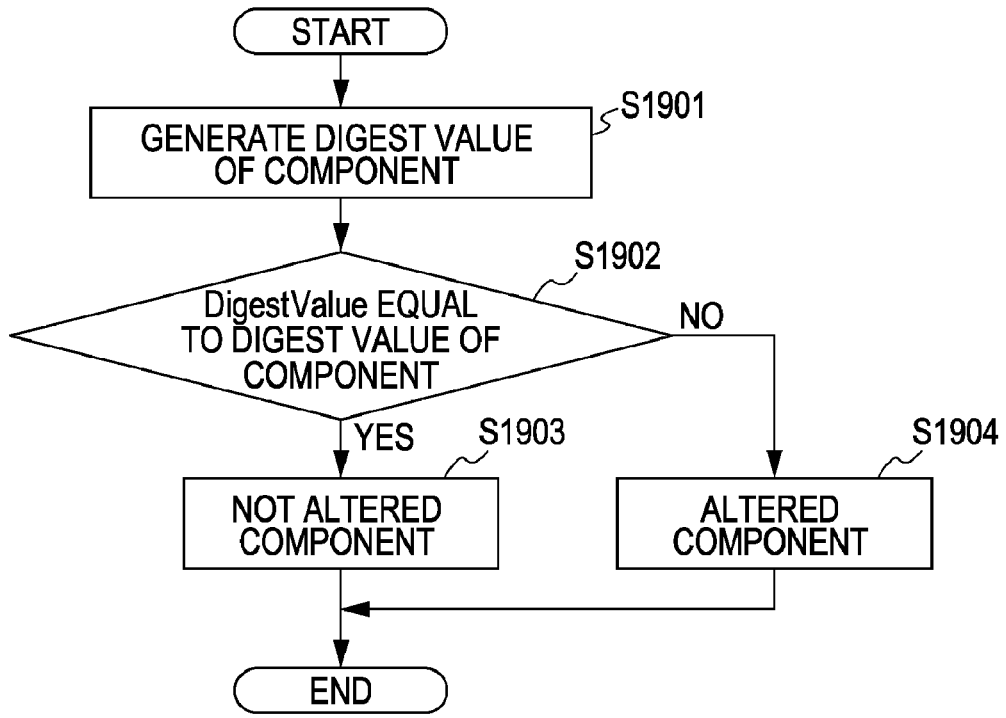
FIG. 19 is a flowchart showing component verification processing according to the second embodiment of the present invention.

FIG. 19 is a flowchart showing component verification processing according to an embodiment of the present invention.

In step S1901, the digest value of each component is calculated. For example, in the example shown in FIG. 17A, a digest value is generated from each of the transmission information and document information.

In step S1902, the digest values of individual components calculated in step S1901 are respectively compared with the DigestValues included in the XML Signature 1601 (DigestValues 1605, 1606, and 1607 shown in FIG. 16). If the digest value of the given component is the same as the corresponding DigestValue included in the XML Signature 1601 ("Yes" in step S1902), the process proceeds to step S1903 where it is determined that the component has not been altered. If they are not the same ("No" in step S1902), the process proceeds to step S1904 where it is determined that the component has been altered.

In both the XML Signature verification processing and the component verification processing, if it is determined that alteration has not been performed (that is, steps S1803 and S1903 shown in FIGS. 18 and 19), it is determined in the signature information verification unit 2004 that components and signature information have not been altered.

Figure 21:
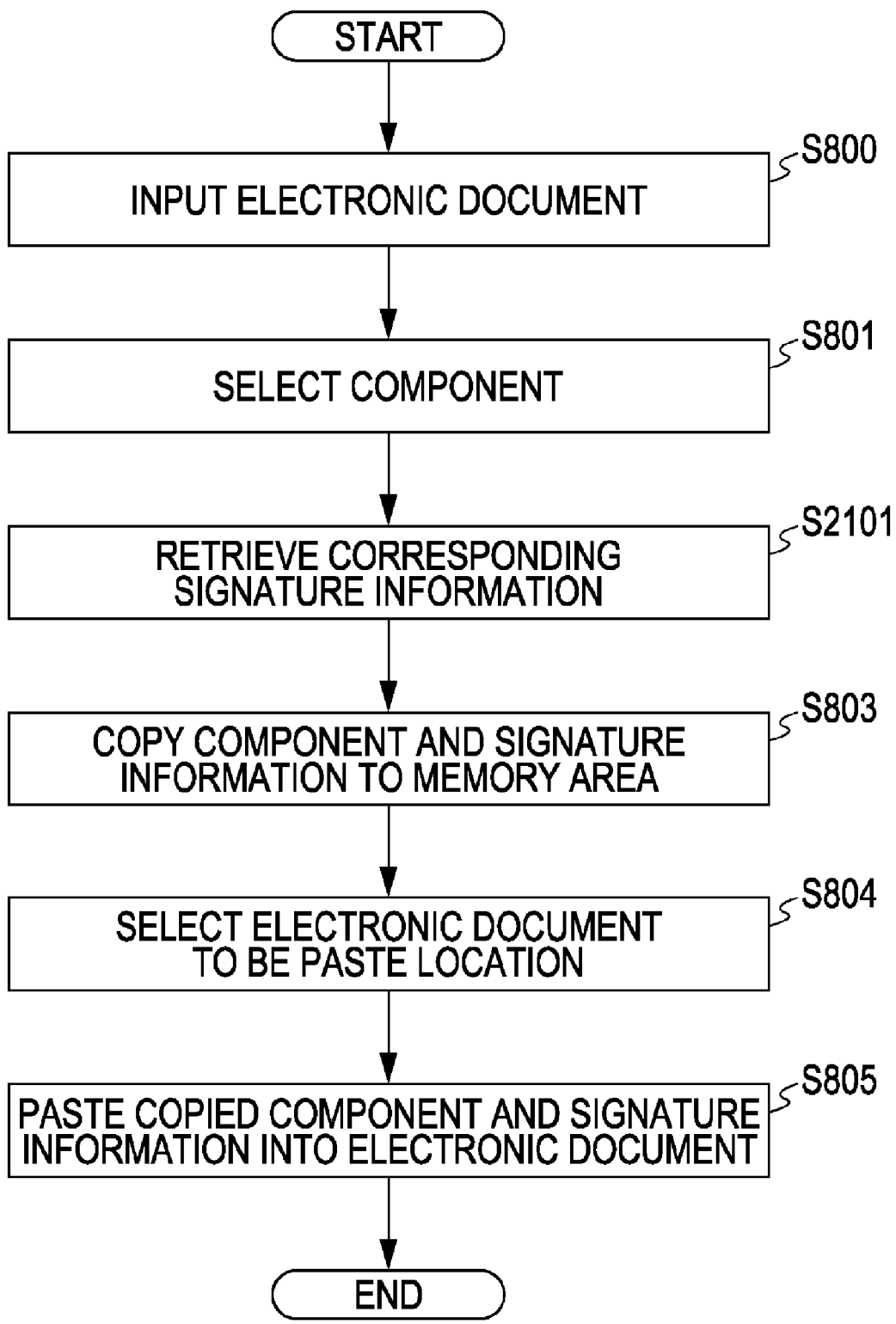
FIG. 21 is a flowchart showing copy and paste editing according to the second embodiment of the present invention.

Processing performed in the electronic document processing unit 2005 will be described with reference to FIG. 21. Processing performed in steps S800, S801, S803, S804, and S805 is the same as that shown in FIG. 8 in the first embodiment, and therefore the description thereof will be omitted.

In step S2101, signature information corresponding to a component is retrieved. More specifically, it is checked whether the URI of a selected component is written in the Reference included in the SignedInfo. If the URI of the selected component is written, it can be determined that the XML Signature corresponds to the selected component.

As described previously, according to this embodiment, even if signature information is an XML Signature that is standardized by W3C, signature information and transmission information can be copied.

Third Exemplary Embodiment

Figure 22:
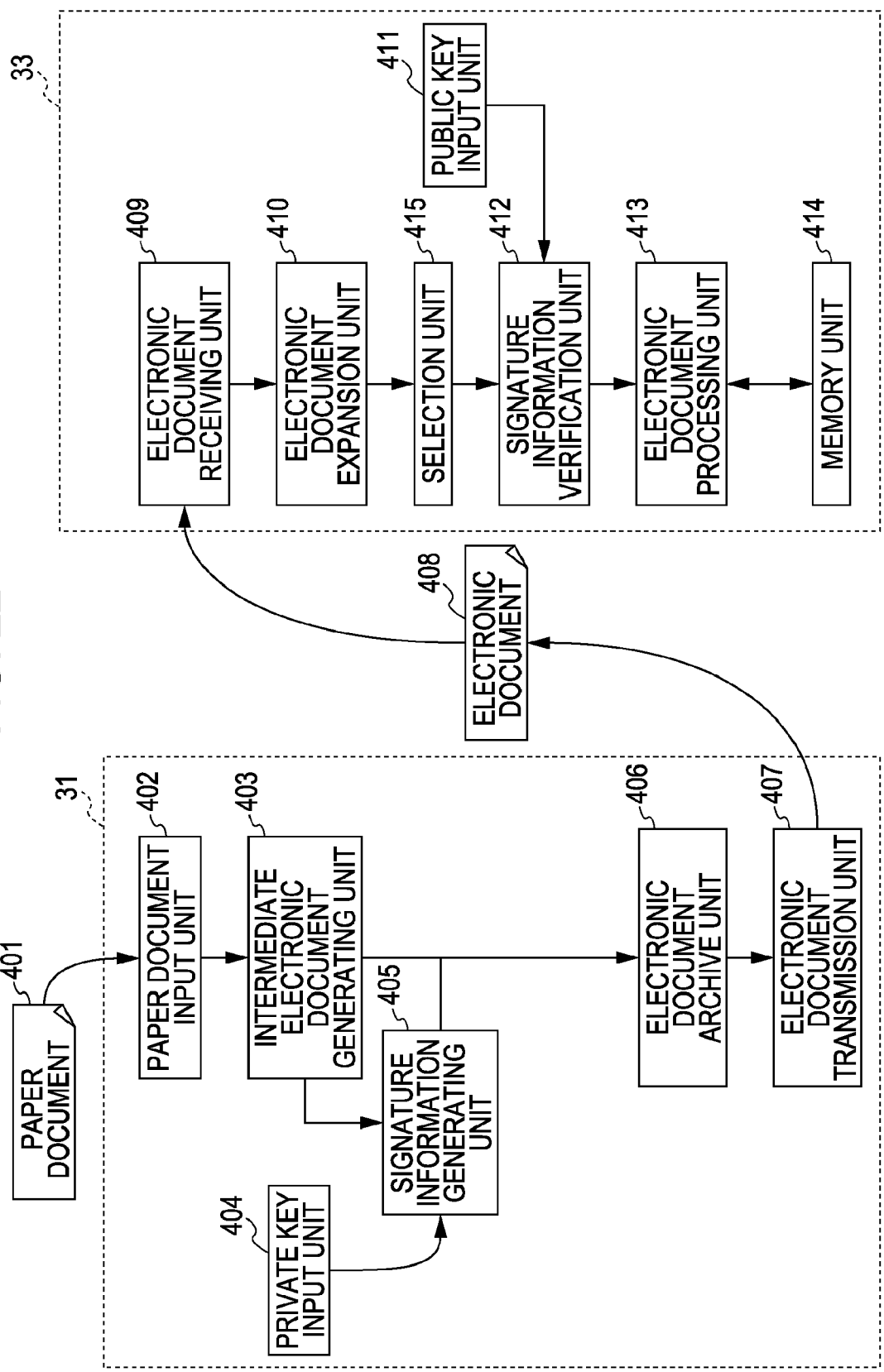
FIG. 22 is a block diagram showing an electronic document generating device and an electronic document processing device according to a third embodiment of the present invention.

In the first and second embodiments, the processing within an electronic document is performed after the signature information verification of the electronic document has been performed in the electronic document processing device. However, in accordance with an aspect of an embodiment of the present invention, the processing within an electronic document may be performed without the signature information verification of the electronic document. For example, as shown in FIG. 22, a component to be copied is selected after an electronic document has been expanded, and the signature information verification may be performed upon only the selected component. Alternatively, as shown in FIG. 23, the processing within an electronic document may be performed without the signature information verification of the electronic document. The configurations and processing procedures shown in FIGS. 22 and 23 that are generally the same as those described in the first and second embodiments will not be described in detail.

It is noted that if the signature information verification is performed upon not an entire electronic document but only a selected component, or if the processing within an electronic document is performed without the signature information verification, the processing time can be shortened.

Even if the signature information verification is not performed, the signature information and components can be copied.

Similar to the first and second embodiments and the case shown in FIG. 22, if the processing within an electronic document is performed after the signature information verification has been performed, the processing within an electronic document may be performed only when the signature information verification has succeeded. In this case, a component and signature information which have been determined to be a component and signature information upon which alteration was not performed can be processed.

According to the first, second, and third embodiments, it can be determined at the location at which a component is to be reused (e.g., pasted) whether the component has been altered without newly generating a signature.

Other Exemplary Embodiments

In the above-described embodiments, hardware configuring a network is included, but each processing unit can be achieved by software. That is, it is obvious that an embodiment of the present invention can also be achieved as follows. A storage medium (or recording medium) storing a program code of software that achieves the functions of the above-described embodiments is provided to a system or an apparatus. The program code stored in the storage medium is read out and executed by the computer (or CPU or MPU) of the system or apparatus, whereby an embodiment of the present invention can be achieved. In this case, the program code itself read out from the storage medium achieves the functions of the above-described embodiments. Accordingly, an embodiment of the present invention can be applied to the storage medium storing the program code.

The function of the above-described embodiments can also be achieved in other cases. For example, an OS (operating system) or the like running on the computer may perform a part of or all of processing in accordance with the instructions of the program code, whereby the functions of the above-described embodiments can be achieved.

Furthermore, the program code read out from the storage medium may be written in a feature expansion board inserted into a computer or in a memory provided to a feature expansion unit connected to a computer. Subsequently, a CPU provided to the feature expansion board or unit performs a part of or all of processing in accordance with the instructions of the program code, whereby the functions of the above-described embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-260883 filed Sep. 8, 2005, and No. 2006-208499 filed Jul. 31, 2006, which are hereby incorporated by reference herein in their entirety.

What is claimed is:

1. A method comprising:
    inputting first document data including a plurality of components and signature information corresponding to each of the components, wherein the signature information is calculated according to a digest value of a corresponding component and a private key, and wherein the plurality of components comprise at least document information and transmission information, wherein the document information comprises at least one of an attribute, layout information, character code string, and document logical construction, and wherein the transmission information comprises information required for rendering processing;
    selecting at least one component from among the plurality of components;
    extracting signature information corresponding to the at least one selected component;
    storing the at least one selected component and the signature information corresponding to the at least one selected component separately in a memory; and
    generating second document data by pasting the at least one stored component and the stored signature information,
    wherein the signature information includes pointer information corresponding to the at least one selected component, and
    wherein the extracting step comprises extracting the pointer information.

2. The method according to claim 1, wherein the generating step comprises:
    selecting an electronic document; and
    pasting the at least one stored component and the stored signature information into the selected electronic document.

3. The method according to claim 1,
    wherein the first document data includes a table indicating correspondence between each of the plurality of components and the signature information corresponding to the components, and
    wherein the signature information corresponding to the at least one selected component is extracted from the table.

4. An information processing apparatus comprising:
    an input unit to input first document data including a plurality of components and signature information corresponding to each of the components, wherein the signature information is calculated according to a digest value of a corresponding component and a private key, and wherein the plurality of components comprise at least document information and transmission information, wherein the document information comprises at least one of an attribute, layout information, character code string, and document logical construction, and wherein the transmission information comprises information required for rendering processing;
    a selecting unit to select at least one component from among the components;
    an extracting unit to extract signature information corresponding to the at least one selected component;
    a storing unit to store the at least one selected component and the signature information corresponding to the at least one selected component separately; and
    a generating unit to generate second document data by pasting the at least one stored component and the stored signature information,
    wherein the signature information includes pointer information corresponding to the at least one selected component, and
    wherein the extracting step comprises extracting the pointer information.

5. The information processing apparatus according to claim 4, wherein the generating unit generates the second document data by selecting an electronic document and pasting the at least one stored component and the stored signature information into the selected electronic document.

6. The information processing apparatus according to claim 4,
- wherein the first document data includes a table indicating correspondence each of the plurality of components and the signature information corresponding to the components, and
- wherein the extracting unit extracts the signature information corresponding to the at least one selected component from the table.

7. A computer readable storage medium storing instructions which, when executed by a computer, causes the computer to perform operations comprising:
- receiving first document data including a plurality of components and signature information corresponding to each of the components, wherein the signature information is calculated according to a digest value of a corresponding component and a private key, and wherein the plurality of components comprise at least document information and transmission information, wherein the document information comprises at least one of an attribute, layout information, character code string, and document logical construction, and wherein the transmission information comprises information required for rendering processing;
- selecting at least one component from among the components;
- extracting signature information corresponding to the at least one selected component;
- storing the at least one selected component and the signature information corresponding to the at least one selected component separately in a memory; and
- generating second document data by pasting the at least one stored component and the stored signature information,
- wherein the signature information includes pointer information corresponding to the at least one selected component, and
- wherein the extracting step comprises extracting the pointer information.

8. The computer readable storage medium of claim 7, wherein the generating step comprises:
- selecting an electronic document; and
- pasting the at least one stored component and the stored signature information into the selected electronic document.

* * * * *